United States Patent
Ghodrat et al.

(10) Patent No.: US 11,720,499 B2
(45) Date of Patent: Aug. 8, 2023

(54) SELECTIVE GENERATION OF MISS REQUESTS FOR CACHE LINES

(71) Applicants: ADVANCED MICRO DEVICES, INC., Santa Clara, CA (US); SAMSUNG ELECTRONICS CO., LTD., Suwon-si (KR)

(72) Inventors: Fataneh Ghodrat, Boxborough, MA (US); Stephen W. Somogyi, Boxborough, MA (US); Zhenhong Liu, Santa Clara, CA (US)

(73) Assignees: Advanced Micro Devices, Inc., Santa Clara, CA (US); SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/134,790

(22) Filed: Dec. 28, 2020

(65) Prior Publication Data

US 2022/0206950 A1 Jun. 30, 2022

(51) Int. Cl.
*G06F 12/0891* (2016.01)
*G06T 1/60* (2006.01)
*G06T 1/20* (2006.01)
*G06F 12/0831* (2016.01)

(52) U.S. Cl.
CPC ...... *G06F 12/0891* (2013.01); *G06F 12/0833* (2013.01); *G06T 1/20* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 2008/0010408 A1* | 1/2008 | Shen | G06F 12/0864 711/118 |
| 2009/0189909 A1* | 7/2009 | Jiao | G06T 1/60 345/506 |
| 2014/0129775 A1 | 5/2014 | Ruehle | |
| 2014/0244939 A1 | 8/2014 | Kwon et al. | |
| 2017/0091093 A1 | 3/2017 | Wang et al. | |
| 2017/0256025 A1* | 9/2017 | Abraham | G06T 15/005 |
| 2018/0018266 A1* | 1/2018 | Jones, III | G06F 12/0811 |
| 2020/0379909 A1 | 12/2020 | Uhrenholt | |

OTHER PUBLICATIONS

International Search Report and Written Opinion dated Apr. 7, 2022 for PCT/US2021/064797, 12 pages.

* cited by examiner

*Primary Examiner* — Charles J Choi

(57) ABSTRACT

A graphics pipeline includes a texture cache having cache lines that are partitioned into a plurality of subsets. The graphics pipeline also includes one or more compute units that selectively generates a miss request for a first subset of the plurality of subsets of a cache line in the texture cache in response to a cache miss for a memory access request to an address associated with the first subset of the cache line. In some embodiments, the cache lines are partitioned into a first sector and a second sector. The compute units generate miss requests for the first sector, and bypass generating miss requests for the second sector, in response to cache misses for memory access requests received during a request cycle being in the first sector.

21 Claims, 5 Drawing Sheets

SELECTIVE GENERATION OF MISS REQUESTS FOR CACHE LINES

BACKGROUND

A graphics processing unit (GPU) processes three-dimensional (3-D) graphics using a graphics pipeline formed of a sequence of programmable shaders and fixed-function hardware blocks. For example, a 3-D model of an object that is visible in a frame can be represented by a set of triangles, other polygons, or patches which are processed in the graphics pipeline to produce values of pixels for display to a user. The triangles, other polygons, or patches are collectively referred to as primitives. The rendering process includes mapping textures to the primitives to incorporate visual details that have a higher resolution than the resolution of the primitives. The GPU includes a dedicated memory that is used to store texture values so that the texture values are available for mapping to primitives that are being processed in the graphics pipeline. Textures can be stored on a disk or procedurally generated as they are needed by the graphics pipeline. The texture data stored in the dedicated GPU memory is populated by loading the texture from the disk or procedurally generating the data. Frequently used texture data is cached in one or more texture caches that are accessed by the shaders or fixed function hardware blocks.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
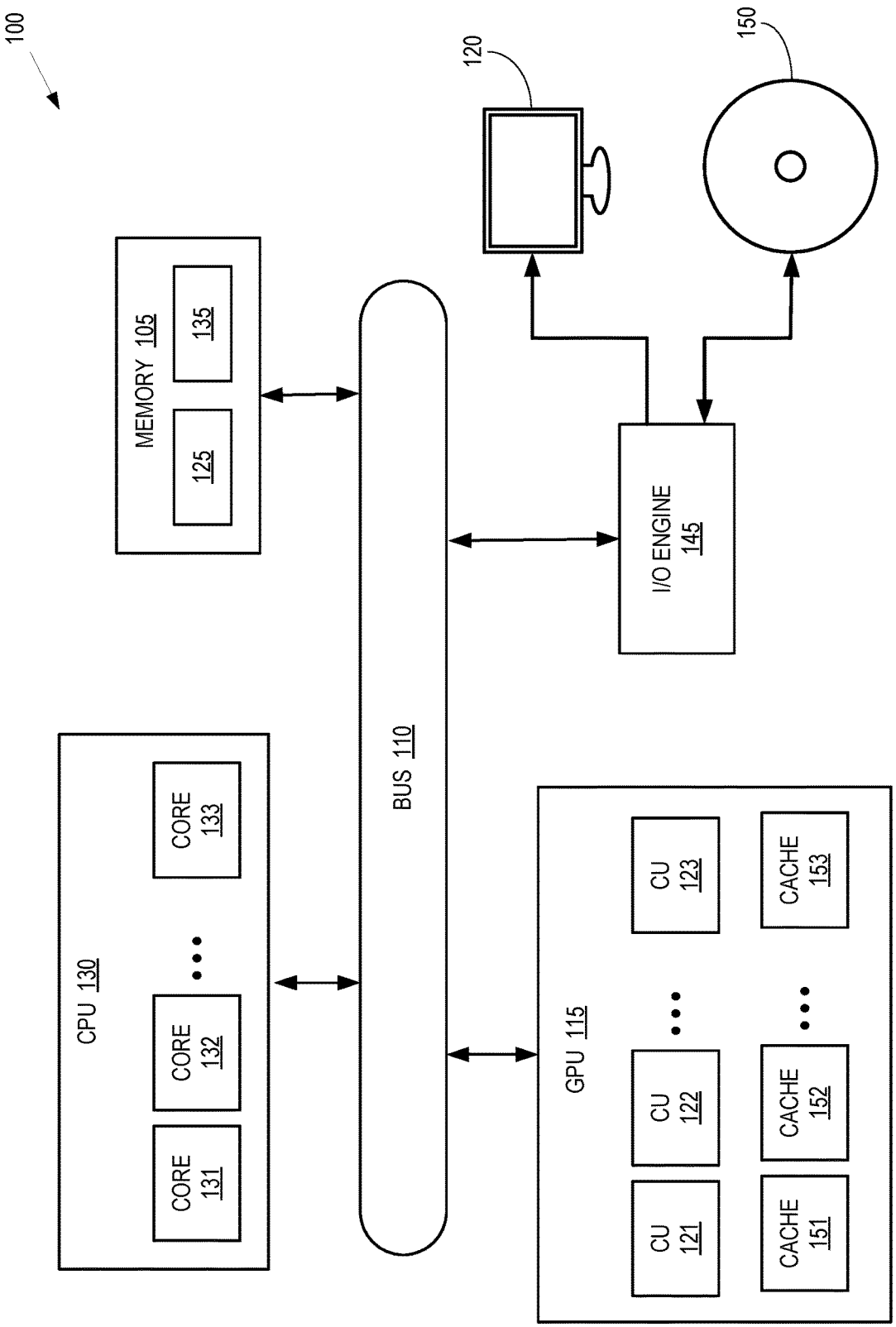
FIG. 1 is a block diagram of a processing system that selectively generates miss requests for portions of cache lines according to some embodiments.

Cache lines in a texture cache are typically configured to hold a large amount of data, e.g., the width of a texture cache line can be on the order of 128 bytes or 1024 (1K) bits. The wide cache lines facilitate caching of the large and/or variable-sized blocks of data that are characteristic of graphics processing. Texture data is stored in tiles such as a tile that has a 4×4 pixel footprint or an 8×8 pixel footprint. The size of the tile also depends on the texture format, which indicates the number of bits that are used to represent each pixel such as an 8-bit format, a 32-bit format, a 128-bit format, and the like. Thus, a tile with an 8×8 pixel footprint can be represented by 526 bits, 2048 bits, 8192 bits, or other numbers of bits depending on the texture format. In operation, the texture cache receives up to N memory access requests per cycle (e.g., read requests or write requests) where N is the size of the vector (for example, the vector size can be 64, 32, or 16), and each cache miss generates a request to retrieve a cache line from a higher-level cache or memory. Given the large size of the cache line, if the requested data is scattered across multiple cache lines, the cache miss requests consume significant memory bandwidth, regardless of the amount of data in the original access request. Furthermore, enabling full cache lines for all request cycles limits opportunities for power savings by disabling portions of the cache that are not needed to store data that is being used by the graphics pipeline.

FIGS. 1-5 disclose systems and techniques for conserving memory bandwidth between a texture cache and system memory (or higher-level caches), while potentially reducing power consumption, by selectively generating miss requests for a subset of a cache line in the texture cache in response to a cache miss for a memory access request to an address associated with the subset of the cache line. In some embodiments, cache lines are partitioned into two or more sectors. A miss request for a full cache line is generated in response to a cache miss by a memory access request (such as a read request) that maps to all the sectors in the cache line, e.g., based on addresses in the memory access request. If the memory access request maps to a single sector of the cache line, a miss request is selectively generated for a full cache line or one of the sectors of the cache line based on evaluation of one or more heuristics or characteristics of the texture data. For example, if color compression or depth compression are enabled for texture data, the miss request is generated for the full cache line. If compression is not enabled for texture data, the miss request is generated only for the sector of the cache line indicated by the memory access request. Miss requests are also selectively generated for subsets of the cache line based on temporal locality of the memory access requests. For example, if a sequence of memory access requests is expected to access different sectors of the cache line, a miss request is generated for the full cache line in response to a cache miss in one of the sectors. Miss requests are also selectively generated for subsets of the cache line based on spatial locality of the memory access requests. For example, if a sequence of memory access requests is expected to access adjacent, proximate, or nearby addresses, a miss request is generated for the full cache line in response to a miss in one of the sectors. In contrast, if addresses of the memory access requests are scattered and have low spatial locality, a miss request is only generated for the sector of the cache line that includes the cache miss.

FIG. 1 is a block diagram of a processing system 100 that selectively generates miss requests for portions of cache lines according to some embodiments. The processing system 100 includes or has access to a memory 105 or other storage component that is implemented using a non-transitory computer-readable medium such as a dynamic random-access memory (DRAM). However, in some cases, the memory 105 is implemented using other types of memory including static random-access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). FIG. 1 illustrates an example of a parallel processor, and in particular a graphics processing unit (GPU) 115, in accordance with some embodiments. The graphics processing unit (GPU) 115 renders images for presentation on a display 120. For example, the GPU 115 renders objects to produce values of pixels that are provided to the display 120, which uses the pixel values to display an image that represents the rendered objects. The GPU 115 implements a plurality of compute units (CU) 121, 122, 123 (collectively referred to herein as "the compute units 121-123") that execute instructions concurrently or in parallel. In some embodiments, the compute units 121-123 include one or more single-instruction-multiple-data (SIMD) units and the compute units 121-123 are aggregated into workgroup processors, shader arrays, shader engines, and the like. The number of compute units 121-123 implemented in the GPU 115 is a matter of design choice and some embodiments of the GPU 115 include more or fewer compute units than shown in FIG. 1. The compute units 121-123 can be used to implement a graphics pipeline, as discussed herein. Some embodiments of the GPU 115 are used for general-purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 implements a plurality of processor cores 131, 132, 133 (collectively referred to herein as "the processor cores 131-133") that execute instructions concurrently or in parallel. The number of processor cores 131-133 implemented in the CPU 130 is a matter of design choice and some embodiments include more or fewer processor cores than illustrated in FIG. 1. The processor cores 131-133 execute instructions such as program code 135 stored in the memory 105 and the CPU 130 stores information in the memory 105 such as the results of the executed instructions. The CPU 130 is also able to initiate graphics processing by issuing draw calls to the GPU 115. Some embodiments of the CPU 130 implement multiple processor cores (not shown in FIG. 1 in the interest of clarity) that execute instructions concurrently or in parallel.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 communicates with the memory 105, the GPU 115, or the CPU 130. In the illustrated embodiment, the I/O engine 145 reads information stored on an external storage component 150, which is implemented using a non-transitory computer-readable medium such as a compact disk (CD), a digital video disc (DVD), and the like. The I/O engine 145 is also able to write information to the external storage component 150, such as the results of processing by the GPU 115 or the CPU 130.

In the illustrated embodiment, the compute units 121-123 in the GPU 115 include (or are associated with) one or more caches 151, 152, 153, which are collectively referred to herein as "the caches 151-153." The caches 151-153 can include an L1 cache, an L2 cache, an L3 cache, or other caches in a cache hierarchy. Portions of the caches 151-153 are used to implement texture caches for a graphics pipeline that is executed on the compute units 121-123. Cache lines in the caches 151-153 are partitioned into subsets such as one or more sectors of the cache lines. The graphics pipeline selectively generates a miss request for a subset of a cache line in the texture cache in response to a cache miss for a memory access request to an address associated with the subset of the cache line. In some embodiments, the cache lines are partitioned into a first sector and a second sector. Miss requests are generated for the first sector, and generation of miss requests for the second sector is bypassed, in response to cache misses for memory access requests received during a request cycle being (exclusively or primarily) in the first sector, as discussed herein.

Figure 2:
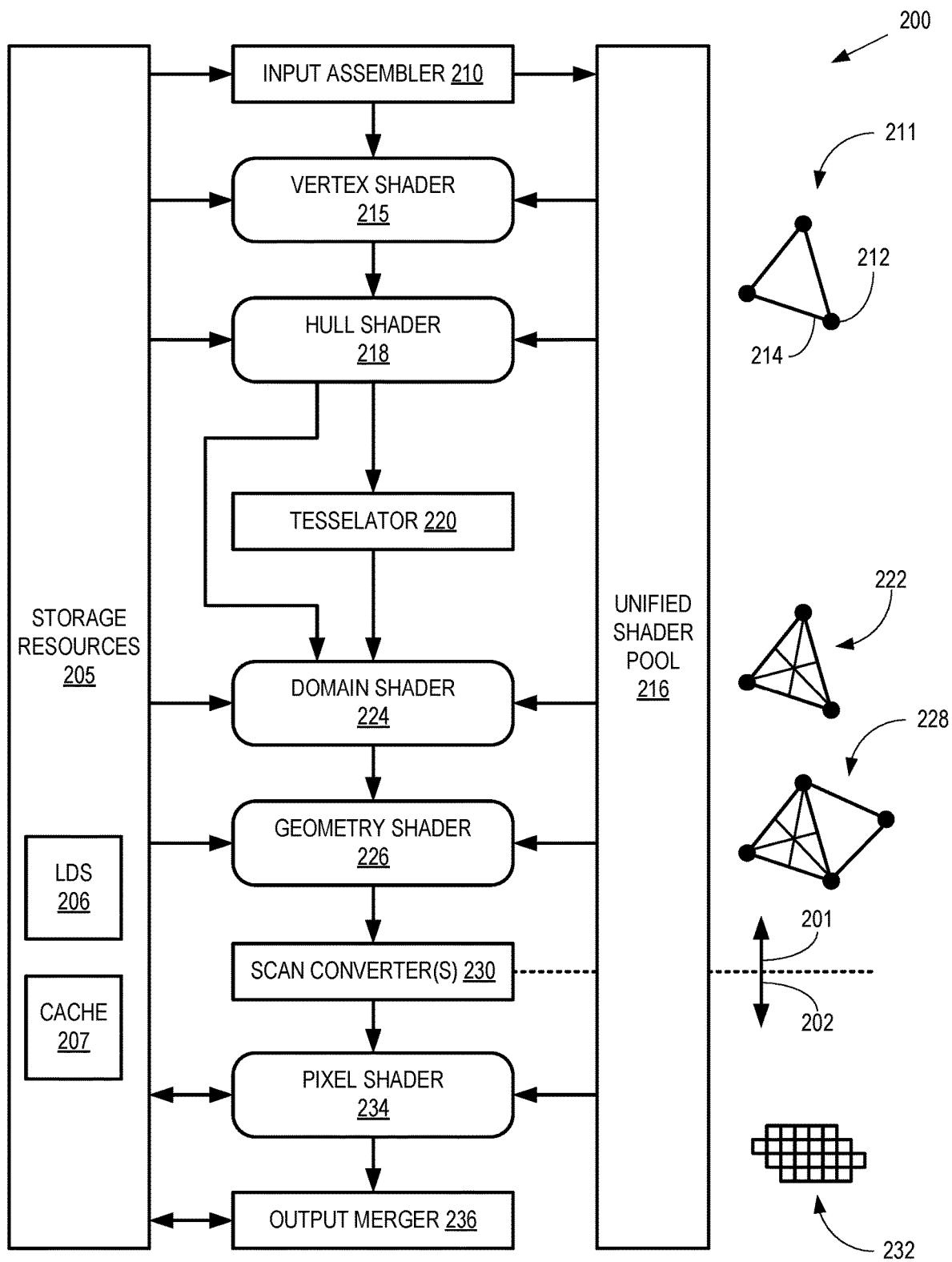
FIG. 2 depicts a graphics pipeline configured to process high-order geometry primitives to generate rasterized images of three-dimensional (3D) scenes at a predetermined resolution according to some embodiments.

FIG. 2 depicts a graphics pipeline 200 configured to process high-order geometry primitives to generate rasterized images of three-dimensional (3D) scenes at a predetermined resolution according to some embodiments. The graphics pipeline 200 is implemented in some embodiments of the processing system 100 shown in FIG. 1. The illustrated embodiment of the graphics pipeline 200 is implemented in accordance with the DX11 specification. Other embodiments of the graphics pipeline 200 are implemented in accordance with other application programming interfaces (APIs) such as Vulkan, Metal, DX12, and the like. The graphics pipeline 200 is subdivided into a geometry portion 201 that includes portions of the graphics pipeline 200 prior to rasterization and a pixel processing portion 202 that includes portions of the graphics pipeline 200 after rasterization.

The graphics pipeline 200 has access to storage resources 205 such as a hierarchy of one or more memories or caches that are used to implement buffers and store vertex data, texture data, and the like. In the illustrated embodiment, the storage resources 205 include local data store (LDS) 206 circuitry that is used to store data and caches 207 that are used to cache frequently used data during rendering by the graphics pipeline 200. The storage resources 205 are implemented using some embodiments of the system memory 105 shown in FIG. 1.

An input assembler 210 accesses information from the storage resources 205 that is used to define objects that represent portions of a model of a scene. An example of a primitive is shown in FIG. 2 as a triangle 211, although other types of primitives are processed in some embodiments of the graphics pipeline 200. The triangle 211 includes one or more vertices 212 that are connected by one or more edges 214 (only one of each shown in FIG. 2 in the interest of clarity). The vertices 212 are shaded during the geometry processing portion 201 of the graphics pipeline 200.

A vertex shader 215, which is implemented in software in the illustrated embodiment, logically receives a single vertex 212 of a primitive as input and outputs a single vertex. Some embodiments of shaders such as the vertex shader 215 implement massive single-instruction-multiple-data (SIMD) processing so that multiple vertices are processed concurrently. The graphics pipeline 200 implements a unified shader model so that all the shaders included in the graphics pipeline 200 have the same execution platform on the shared massive SIMD compute units. The shaders, including the vertex shader 215, are therefore implemented using a common set of resources that is referred to herein as the unified shader pool 216.

A hull shader 218 operates on input high-order patches or control points that are used to define the input patches. The hull shader 218 outputs tessellation factors and other patch data. In some embodiments, primitives generated by the hull shader 218 are provided to a tessellator 220. The tessellator 220 receives objects (such as patches) from the hull shader 218 and generates information identifying primitives corresponding to the input object, e.g., by tessellating the input objects based on tessellation factors provided to the tessellator 220 by the hull shader 218. Tessellation subdivides input higher-order primitives such as patches into a set of lower-order output primitives that represent finer levels of detail, e.g., as indicated by tessellation factors that specify the granularity of the primitives produced by the tessellation process. A model of a scene is therefore represented by a smaller number of higher-order primitives (to save memory or bandwidth) and additional details are added by tessellating the higher-order primitive.

A domain shader 224 inputs a domain location and (optionally) other patch data. The domain shader 224 operates on the provided information and generates a single vertex for output based on the input domain location and other information. In the illustrated embodiment, the domain shader 224 generates primitives 222 based on the triangles 211 and the tessellation factors. A geometry shader 226 receives an input primitive and outputs up to four primitives that are generated by the geometry shader 226 based on the input primitive. In the illustrated embodiment, the geometry shader 226 generates the output primitives 228 based on the tessellated primitive 222.

One stream of primitives is provided to one or more scan converters 230 and, in some embodiments, up to four streams of primitives are concatenated to buffers in the storage resources 205. The scan converters 230 perform shading operations and other operations such as clipping, perspective dividing, scissoring, and viewport selection, and the like. The scan converters 230 generate a set 232 of pixels that are subsequently processed in the pixel processing portion 202 of the graphics pipeline 200.

In the illustrated embodiment, a pixel shader 234 inputs a pixel flow (e.g., including the set 232 of pixels) and outputs zero or another pixel flow in response to the input pixel flow. An output merger block 236 performs blend, depth, stencil, or other operations on pixels received from the pixel shader 234.

Some or all the shaders in the graphics pipeline 200 perform texture mapping using texture data that is stored in the storage resources 205. For example, the pixel shader 234 can read texture data from the storage resources 205 and use the texture data to shade one or more pixels. The shaded pixels are then provided to a display for presentation to a user. As discussed herein, texture data used by shaders in the graphics pipeline 200 is cached using the cache 207. Miss requests are selectively generated in response to cache misses in the cache 207, e.g., based on the locations of addresses in portions of the cache lines of the cache 207, heuristics or characteristics of the request or data, temporal locality, spatial locality, and the like.

Figure 3:
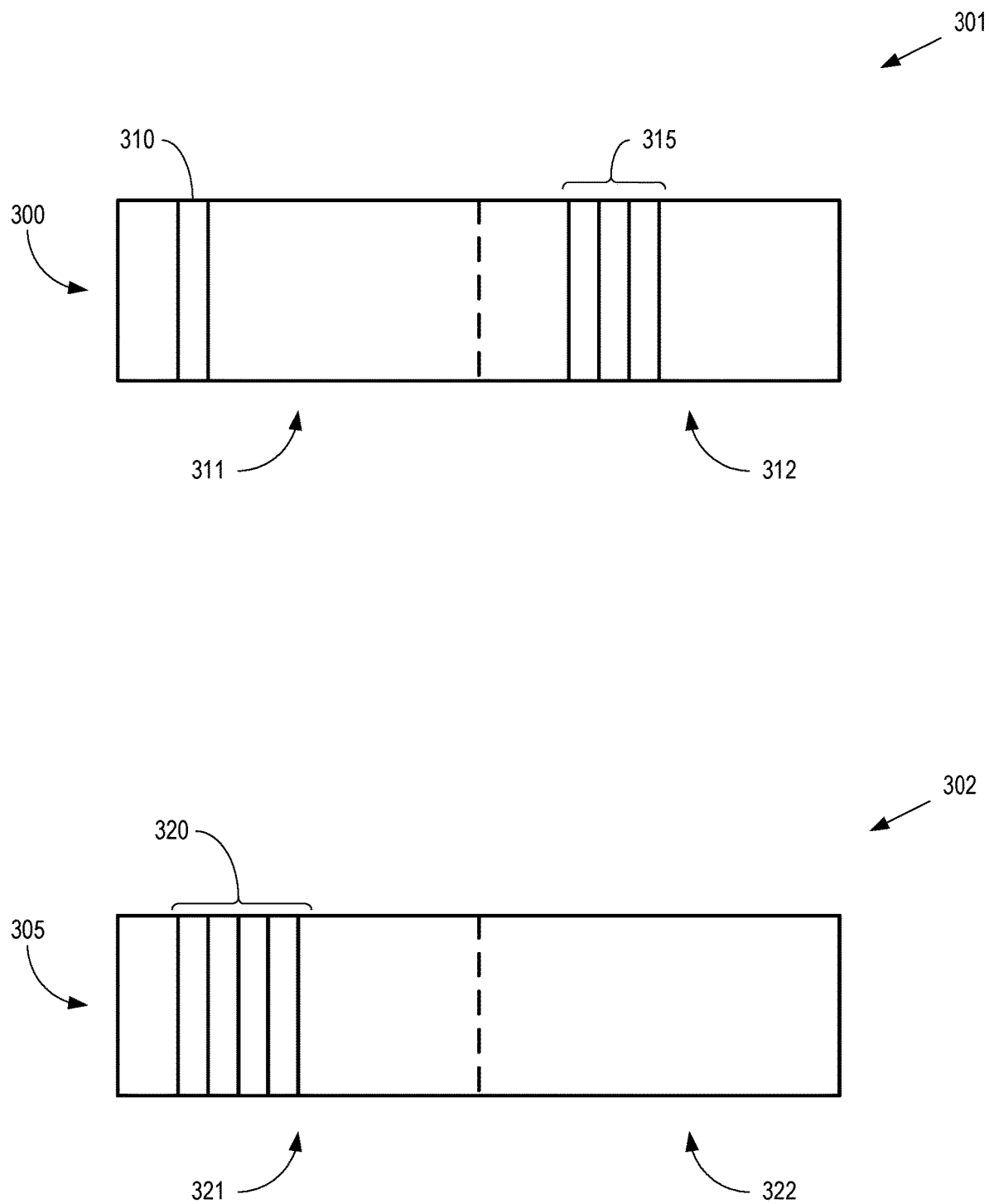
FIG. 3 is a block diagram of a cache line having requests distributed over multiple sectors in a first read cycle and requests constrained to a single sector in a second read cycle according to some embodiments.

FIG. 3 is a block diagram of cache lines having requests distributed over multiple sectors in a first read cycle 301 and requests constrained to a single sector in a second read cycle 302 according to some embodiments. The cache lines 300, 305 represent cache lines in some embodiments of the caches 151-153 shown in FIG. 1 and some embodiments of the cache 207 shown in FIG. 2. The cache lines 300, 305 are used to store textures for graphics processing and the cache line is therefore relatively large. For example, the cache lines 300, 305 can each store 128 bytes (i.e., 1K bits) of data for access by corresponding compute units or other processors, processor cores, processing elements, and the like. In the illustrated embodiment, the cache lines 300, 305 are partitioned into two sectors. However, in some embodiments, the cache lines 300, 305 are partitioned into more than two sectors.

During the first read cycle 301, the cache line 300 receives a read request to an address that indicates a location 310 that holds a subset of the bytes stored by the cache line 300. The location 310 is in a first sector 311 of the cache line 300. The cache line 300 also receives read requests to addresses that indicate locations 315 that hold another subset of the bytes stored by the cache line 300. The locations 315 are in a second sector 312 of the cache line 300. In the illustrated embodiment, the read requests to the location 310 and the locations 315 miss in the cache line 300.

During the second read cycle 302, the cache line 305 receives read requests to addresses that indicate locations 320 that hold a subset of the bytes stored by the cache line 305. The locations 320 are in the first sector 321 of the cache line 305 and none of the locations 320 are in the second sector 322 of the cache line 305. In the illustrated embodiment, the read requests to the locations 320 miss in the cache line 305.

Miss requests are selectively generated for the first sectors 311, 321, the second sectors 312, 322, or both sectors 311, 312, 321, 322 (e.g., the full cache lines 300 and 305) based on the locations of the cache misses in the cache lines 300, 305. In some embodiments, other heuristics or characteristics of the cache misses are also used to determine whether miss requests are generated for the first sectors 311, 321, the second sectors 312, 322 or both sectors 311, 312, 321, 322, as discussed herein. For example, measured, expected, or predicted spatial locality or temporal locality of the cache misses can be used to determine how the miss requests are generated. In the illustrated embodiment, a miss request is generated for the full cache line 300 (e.g., the sectors 311 and 312) in response to the cache misses in the first read cycle 301 including the location 310 in the first sector 311 and the locations 315 in the second sector 312. During the second read cycle 302, a miss request is only generated for the first sector 321 (and generation of a miss request for the second sector 322 is bypassed) in response to the cache misses in the second read cycle 302 being to locations 320 that are only in the first sector 321.

Figure 4:
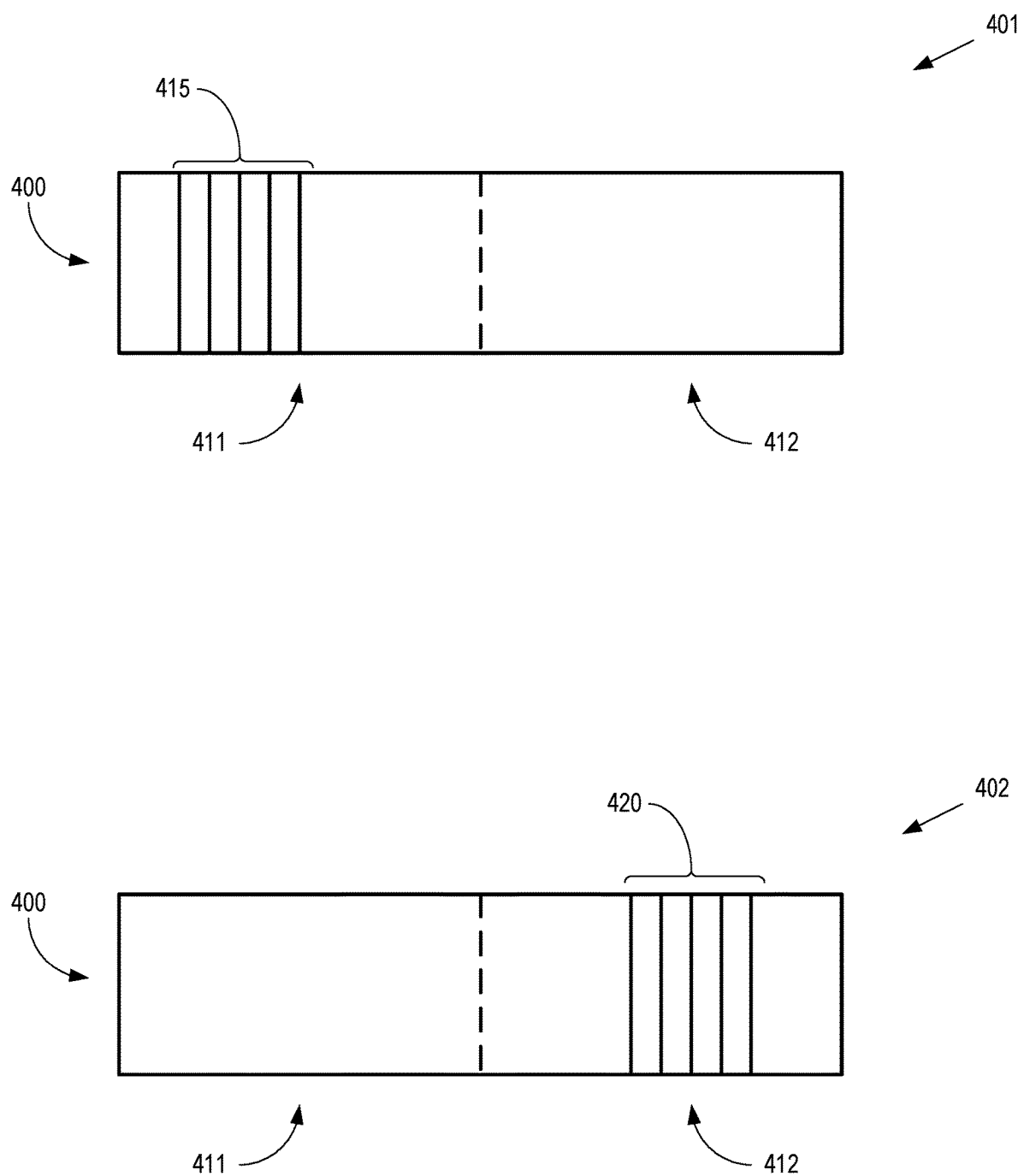
FIG. 4 is a block diagram of a cache line having requests that do not exhibit a high degree of temporal locality during a first read cycle and a second read cycle according to some embodiments.

FIG. 4 is a block diagram of a cache line 400 having requests that do not exhibit a high degree of temporal locality in a first read cycle 401 and a second read cycle 402 according to some embodiments. The cache line 400 represents a cache line in some embodiments of the caches 151-153 shown in FIG. 1 and some embodiments of the cache 207 shown in FIG. 2. The cache line 400 is used to store textures for graphics processing and the cache line is therefore relatively large, e.g., 128 bytes of data. In the illustrated embodiment, the cache line 400 is partitioned into two sectors 411, 412. However, in some embodiments, the cache line 400 is partitioned into more than two sectors.

During the first read cycle 401, the cache line 400 receives read requests to addresses that indicate locations 415 that hold a subset of the bytes stored by the cache line 400. The locations 415 are all found within the first sector 411. During the second read cycle 402, the cache line 400 receives read requests to addresses that indicate locations 420 that hold a subset of the bytes stored by the cache line 400. The locations 420 are all in the second sector 412 of the cache line 400. In the illustrated embodiment, miss requests are selectively generated for the first sector 411 or the second sector 412 based, at least in part, on the actual or predicted temporal locality of the cache misses. A miss request is therefore generated for the full cache line (e.g., the first sector 411 and the second sector 412) because the cache misses in successive read cycles (e.g., the first read cycle 401 and the second read cycle 402) are distributed over the first sector 411 and the second sector 412. In contrast, if the read requests to the cache line 400 exhibit a high degree of temporal locality, e.g., the read requests during multiple cycles are expected or predicted to be for addresses located in only one of the sectors 411, 412, a miss request is only generated for the corresponding sector.

Miss requests are also generated for different portions of the cache line 400 based on predicted spatial locality of the read requests. For example, if a pixel shader is scanning across the screen, a sequence of read requests is likely to be for local addresses associated with neighboring or proximate pixel locations. Thus, the efficiency and performance of the memory access system are likely to be improved by fetching a full cache line if the predicted spatial locality is high (e.g., above a threshold), even if cache misses during a current read cycle are only (or primarily) within a single sector because subsequent read requests are likely to be for nearby addresses, which may be in other sectors of the cache line. In contrast, if the predicted spatial locality is low (e.g., below the threshold), miss requests may only be generated for a single sector if the cache misses during the current read cycle are to locations in the single sector. In some embodiments, information associating with the read requests or miss requests are held for a hysteresis window and the information in the hysteresis window is used to determine or predict temporal or spatial locality of the read requests or miss requests.

Figure 5:
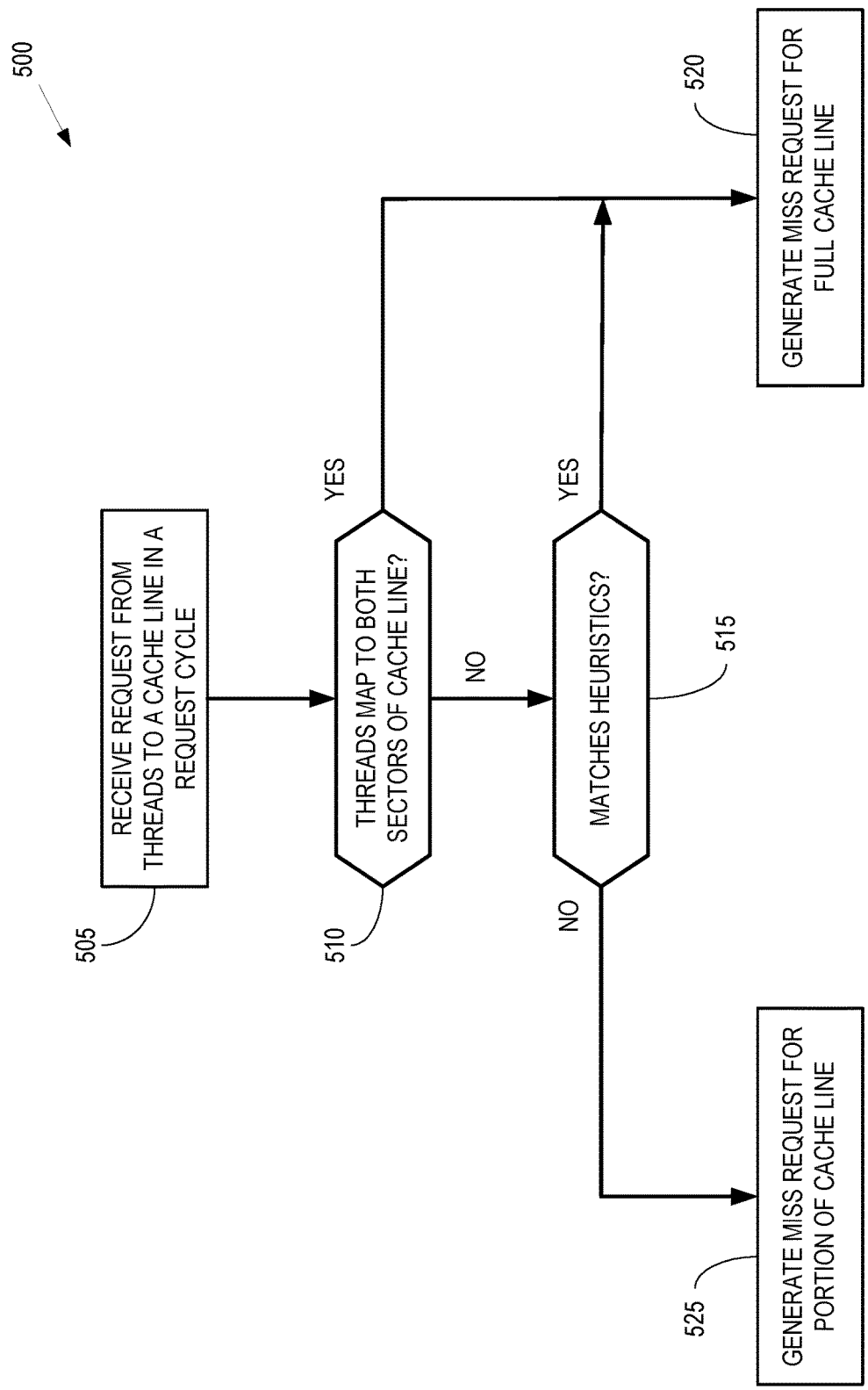
FIG. 5 is a flow diagram of a method of selectively generating miss requests for portions of a cache line according to some embodiments.

FIG. 5 is a flow diagram of a method 500 of selectively generating miss requests for portions of a cache line according to some embodiments. The method 500 is implemented in some embodiments of the processing system 100 shown in FIG. 1 and the graphics pipeline 200 shown in FIG. 2. The cache lines include two sectors (or portions or halves), although the cache lines include more sectors in some embodiments.

At block 505, a cache receives read requests from threads to a cache line during a request cycle. The read requests include addresses that indicate locations within the cache line and corresponding memory. In the illustrated embodiment, the read requests miss in the cache line, which triggers the selective generation of miss requests to fetch the requested data from the backing memory or higher-level caches.

At decision block 510, the cache determines whether the threads that generated the cache misses during the current request cycle map to locations in both sectors of the cache line. If so, the method 500 flows to block 520. Otherwise, the method 500 flows to decision block 515.

At decision block 515, the cache determines the likelihood of spatial or temporal locality based on certain heuristics. In some embodiments, the likelihood of spatial or temporal locality is determined based on whether there is a match to a fixed or programmable heuristic. For example, whether the information in the cache line is generated using color compression or depth compression, which indicates that the associated data has a high degree of spatial locality and subsequent read requests are likely to include addresses in both sectors of the cache line. Thus, if the information is expected to have high degree of locality, the method 500 flows to the block 520. Otherwise, the method 500 flows to the block 525.

At block 520, the cache generates a miss request for the full cache line, i.e., the cache generates a miss request that includes all the sectors of the cache line. At block 525, the cache generates a miss request for the sector (or portion or half) of the cache line that includes the locations corresponding to the addresses in the cache misses for the threads during the request cycle.

A computer-readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims.

What is claimed is:

1. An apparatus comprising:
   a texture cache comprising cache lines that are partitioned into a plurality of subsets; and
   at least one compute unit in a graphics pipeline, wherein the compute unit is configured to selectively generate a miss request for a first subset of the plurality of subsets of a cache line in the texture cache in response to:
      a cache miss for a memory access request to an address associated with the first subset of the cache line; and
      a characteristic of data stored at the cache line, the characteristic indicating whether color compression or depth compression is enabled.

2. The apparatus of claim 1, wherein the at least one compute unit is configured to determine whether the cache miss associated with a memory access request maps only to the first subset of the plurality of subsets or maps to one or more subsets additional to or other than the first subset of the plurality of subsets.

3. The apparatus of claim 2, wherein the at least one compute unit is configured to generate a miss request for a full cache line in response to the cache miss mapping to a subset additional to or other than the first subset of the plurality of subsets.

4. The apparatus of claim 3, wherein the at least one compute unit is configured to determine whether at least one of color compression and depth compression is enabled for texture data in response to the memory access request mapping only to the first subset.

5. The apparatus of claim 4, wherein the at least one compute unit is configured to generate a miss request for the full cache line in response to the at least one of color compression and depth compression being enabled for the texture data.

6. The apparatus of claim 4, wherein the at least one compute unit is configured to generate a miss request for the first subset of the cache line in response to the at least one of color compression and the depth compression not being enabled for the texture data.

7. The apparatus of claim 1, wherein the at least one compute unit is configured to selectively generate the miss request to the first subset or the plurality of subsets based on at least one of temporal locality and spatial locality of the memory access request.

8. The apparatus of claim 7, wherein the at least one compute unit is configured to generate a miss request for the plurality of subsets in response to a cache miss in the first subset in response to a sequence of memory access requests being expected to access the plurality of subsets.

9. The apparatus of claim 7, wherein the at least one compute unit is configured to generate a miss request for the plurality of subsets in response to a cache miss in the first subset and in response to a sequence of memory access requests having a spatial locality above a threshold.

10. The apparatus of claim 9, wherein the at least one compute unit is configured to generate a miss request for the first subset in response to the memory access requests having a spatial locality below the threshold.

11. A method comprising:
    detecting a miss request to a cache line in a texture cache comprising cache lines that are partitioned into a plurality of subsets; and
    selectively generating a miss request for a first subset of the plurality of subsets of a cache line in the texture cache in response to:
       the cache miss being to an address associated with the first subset of the cache line; and
       a characteristic of data stored at the cache line, the characteristic indicating whether color compression or depth compression is enabled.

12. The method of claim 11, further comprising: determining whether the cache miss associated with a memory access request maps only to the first subset of the plurality of subsets or maps to one or more subsets additional to or other than the first subset of the plurality of subsets.

13. The method of claim 12, further comprising:
    generating a miss request for a full cache line in response to the cache miss mapping to the plurality of subsets.

14. The method of claim 13, further comprising:
    determining whether at least one of color compression and depth compression is enabled for texture data.

15. The method of claim 14, wherein selectively generating the miss request comprises generating a miss request for the plurality of subsets in response to the at least one of color compression and depth compression being enabled for the texture data.

16. The method of claim 14, wherein selectively generating the miss request comprises generating a miss request for the first subset of the cache line in response to the at least one of color compression and the depth compression not being enabled for the texture data.

17. The method of claim 11, wherein selectively generating the miss request comprises generating a miss request for the plurality of subsets in response to a cache miss in the first subset and in response to a sequence of memory access requests being expected to access different sectors of the cache line.

18. The method of claim 11, wherein selectively generating the miss request comprises generating a miss request for the plurality of subsets in response to a cache miss in the first subset and in response to a sequence of memory access requests having a spatial locality above a threshold.

19. The method of claim 18, wherein selectively generating the miss request comprises generating a miss request for the first subset in response to the memory access requests having a spatial locality below the threshold.

20. An apparatus comprising:
    a texture cache comprising cache lines that are partitioned into a first sector and a second sector; and
    at least one compute unit in a graphics pipeline, wherein the at least one compute unit is configured to generate miss requests for the first sector, and bypass generating miss requests for the second sector, in response to:
       cache misses for memory access requests received during a request cycle being in the first sector; and
       a characteristic of data stored at the cache line, the characteristic indicating whether color compression or depth compression is enabled.

21. The apparatus of claim 20, wherein the at least one compute unit is configured to generate miss requests for the first sector and the second sector in response to cache misses for the memory access requests received during the request cycle being in the first sector and the second sector.

\* \* \* \* \*